US012183982B2

(12) United States Patent
Shin et al.

(10) Patent No.: US 12,183,982 B2
(45) Date of Patent: Dec. 31, 2024

(54) ROTATABLE ANTENNA SYSTEM WITH WIRELESS ROTATABLE INTERCONNECT

(71) Applicant: ViaSat, Inc., Carlsbad, CA (US)

(72) Inventors: Eric B. Shin, Dunwoody, GA (US); Kevin M. Skinner, Gainesville, GA (US)

(73) Assignee: VIASAT, INC., Carlsbad, CA (US)

( * ) Notice: Subject to any disclaimer, the term of this patent is extended or adjusted under 35 U.S.C. 154(b) by 329 days.

(21) Appl. No.: 17/600,995

(22) PCT Filed: Mar. 26, 2020

(86) PCT No.: PCT/US2020/024918
§ 371 (c)(1),
(2) Date: Oct. 1, 2021

(87) PCT Pub. No.: WO2020/205423
PCT Pub. Date: Oct. 8, 2020

(65) Prior Publication Data
US 2022/0200144 A1    Jun. 23, 2022

Related U.S. Application Data

(60) Provisional application No. 62/828,612, filed on Apr. 3, 2019.

(51) Int. Cl.
*H01Q 3/08* (2006.01)
*H01Q 3/00* (2006.01)
(Continued)

(52) U.S. Cl.
CPC .............. *H01Q 3/08* (2013.01); *H01Q 3/005* (2013.01); *H01Q 19/17* (2013.01); *H02J 50/005* (2020.01); *H02J 50/10* (2016.02)

(58) Field of Classification Search
CPC .......... H01Q 3/08; H01Q 3/005; H01Q 19/17; H02J 50/005; H02J 50/10
See application file for complete search history.

(56) References Cited

U.S. PATENT DOCUMENTS 5,455,466 A    10/1995    Parks et al.
7,710,337 B2 *  5/2010    Blalock .................. H01Q 1/125
                                                 343/765
(Continued)

FOREIGN PATENT DOCUMENTS

CN    105552512    5/2016
CN    108200779    6/2018
(Continued)

OTHER PUBLICATIONS

International Search Report and Written Opinion dated May 25, 2020 in Application No. PCT/US2020/024918.
(Continued)

*Primary Examiner* — Thai T Dinh
(74) *Attorney, Agent, or Firm* — Snell & Wilmer L.L.P.

(57) ABSTRACT

A rotatable antenna is disclosed comprising a wireless rotatable interconnect comprising: a stator coil pad, a rotor coil pad, and a radiating element coupled to the rotor coil pad. In an embodiment, changes in a rotation of the rotor coil pad about an axis change a pointing direction of the radiating element. Moreover, a first channel of a plurality of wireless channels transfers power from the stator coil pad to the rotor coil pad and a second channel of the plurality of wireless channels transfers data between the stator coil pad and the rotor coil pad. Also, a data encoder may be coupled to the rotor coil pad that modulates at least a portion of the data transmitted through the second channel of the plurality of wireless channels onto a radio frequency (RF) signal, and provides the RF signal to the radiating element.

13 Claims, 8 Drawing Sheets

(51) Int. Cl.
*H01Q 19/17* (2006.01)
*H02J 50/00* (2016.01)
*H02J 50/10* (2016.01)

(56) References Cited

U.S. PATENT DOCUMENTS

| | | | | |
|---|---|---|---|---|
| 8,184,059 | B2* | 5/2012 | Bunch | H01Q 3/08 343/765 |
| 10,854,969 | B2* | 12/2020 | Roitberg | H04B 1/38 |
| 2008/0278271 | A1* | 11/2008 | Blalock | H01Q 3/02 335/268 |
| 2010/0101341 | A1* | 4/2010 | Bunch | H01Q 3/08 74/5.37 |
| 2015/0194845 | A1* | 7/2015 | Homma | H02J 50/23 307/104 |
| 2018/0302151 | A1 | 10/2018 | Rosenband et al. | |

FOREIGN PATENT DOCUMENTS

| | | |
|---|---|---|
| DE | 102010055347 | 1/2012 |
| EP | 2113961 | 11/2009 |
| JP | 2014011938 | 1/2024 |
| WO | 2014059129 | 4/2014 |

OTHER PUBLICATIONS

International Preliminary Report on Patentability dated Feb. 26, 2021 in Application No. PCT/US2020/024918.

Mao et al., "Simultaneous Wireless Power Transfer and Data Communication Using Synchronous Pulse-Controlled Load Modulation", Measurement (Lond); 109: 316-325. doi:10.1016/j.measurement (2017).

Mesa Systems Co., "INPUD-SLK 100 Watts of Power & Bus repeater", https://web.archive.org/web/20150217124907/http://www.mesasystemsco.com/product.php?p=56 (2019).

Mesa Systems Co., "Inductive Power/Data Coupling Devices", https://web.archive.org/web/20150217104015/http://mesasystemsco.com/category.php?cat=2 (2019).

Powerbyproxi "Proxi-Point Wireless Connector", https://web.archive.org/web/20150320075735/http://powerbyproxi.com/industrial-applications/proxi-point/ (2019).

* cited by examiner

ROTATABLE ANTENNA SYSTEM WITH WIRELESS ROTATABLE INTERCONNECT

CROSS REFERENCE TO RELATED APPLICATIONS

This application is a U.S. national stage entry under 35 U.S.C. § 371 of International Application No. PCT/US2020/024918 filed on Mar. 26, 2020 entitled "ROTATABLE ANTENNA SYSTEM WITH WIRELESS ROTATABLE INTERCONNECT", which claims priority to, and the benefit of, U.S. Provisional Application No. 62/828,612, filed on Apr. 3, 2019, entitled, "ANTENNA SYSTEM WITH WIRELESS ROTATABLE INTERCONNECT", which are incorporated herein by reference in its entirety.

TECHNICAL FIELD

This disclosure relates generally to rotatable antenna systems. More particularly, this disclosure describes an antenna system with a wireless rotatable interconnect.

BACKGROUND

A satellite antenna (e.g., a directional antenna) can be implemented as a satellite dish for a moveable station, such as an aircraft, a watercraft or a terrestrial vehicle. In some such examples, the satellite antenna includes a parabolic reflector and a feed antenna. Alternatively, the satellite antenna can be implemented as a waveguide array. Moreover, the support structure for the satellite antenna can include a base on which the satellite antenna is mounted. Further, the support structure can include a moveable joint or multiple pivot points to allow the satellite antenna to change an azimuth, elevation and/or skew to adjust the pointing of the satellite antenna.

Automatic tracking satellite antennas are satellite antennas used while a vehicle, such as an aircraft, a terrestrial vehicle or a watercraft is in motion. Automatic tracking satellite dishes utilize gyroscopes, global positioning system (GPS) position sensors, unique satellite identification data and an integrated data decoder to aid in identification of a particular satellite at which the satellite antenna is pointing. Automatic tracking satellite antennas include motors to drive and aim the satellite antenna and rate sensors to detect changes in position while the vehicle is in motion.

SUMMARY

In one example, a rotatable antenna can include a wireless rotatable interconnect having a stator coil pad coupled to a power supply port for receiving power and to a data port for communication of data and a rotor coil pad that is in bi-directional communication with the stator coil pad. The rotor coil pad superposes the stator coil pad and the rotor coil pad is spaced apart from the stator coil pad. Moreover, the rotor coil pad is rotatable about an axis. The rotatable antenna can include a radiating element coupled to the rotor coil pad. Changes in a rotation of the rotor coil pad about the axis change a pointing direction of the radiating element. A plurality of wireless channels are established between the stator coil pad and the rotor coil pad and a first channel of the plurality of wireless channels transfers power from the stator coil pad to the rotor coil pad and a second channel of the plurality of wireless channels transfers data between the stator coil pad and the rotor coil pad.

DETAILED DESCRIPTION

Figure 1:
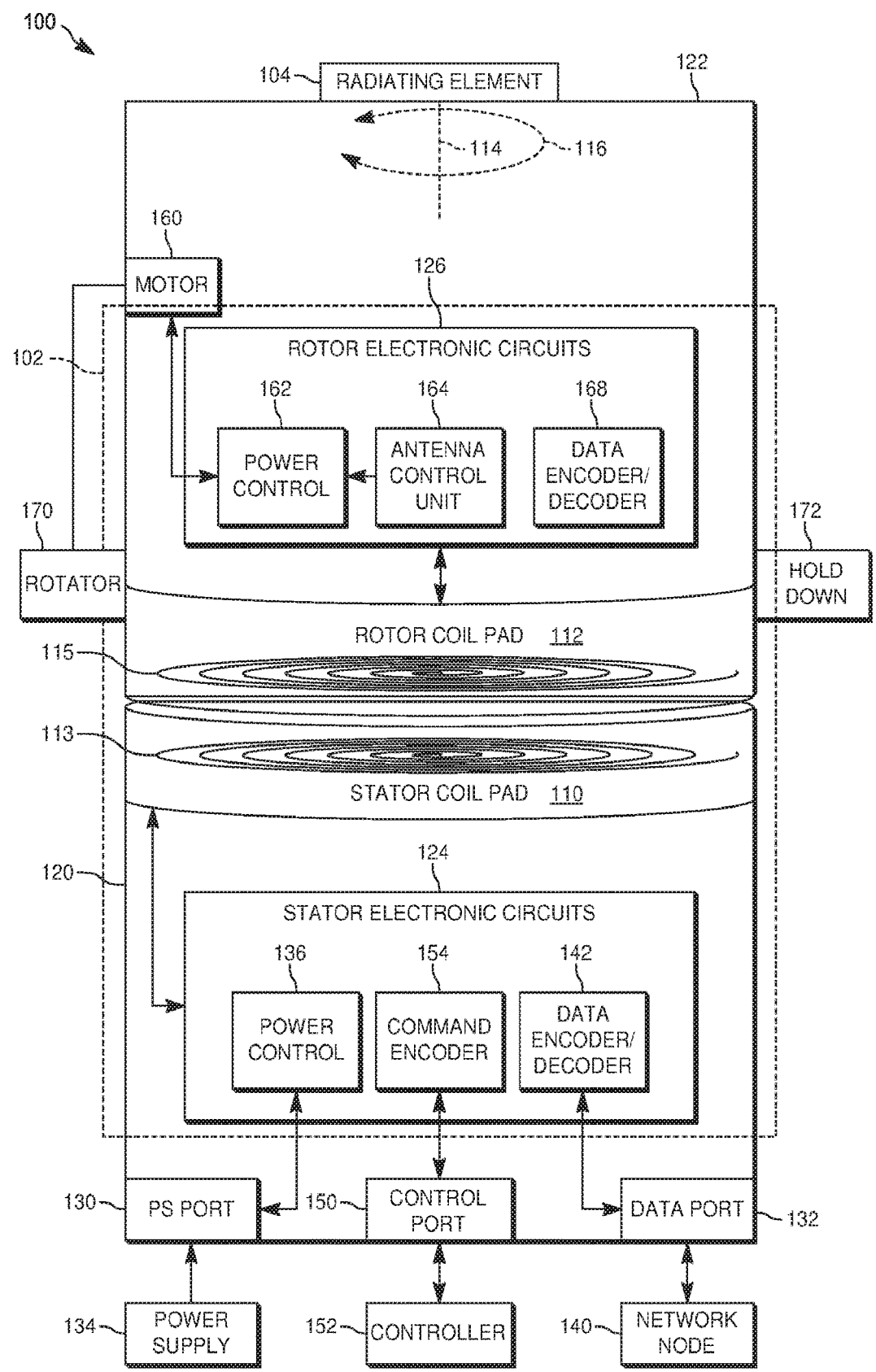
FIG. 1 illustrates a block diagram of a rotatable antenna system with a wireless rotatable interconnect.

This disclosure describes a rotatable antenna system, such as an antenna system for communicating with a satellite. The rotatable antenna system can be mounted on a vehicle, such as an aircraft, a terrestrial vehicle or a watercraft. The rotatable antenna system can include a wireless rotatable interconnect. The wireless rotatable interconnect provides a low friction (or friction free) interface for rotation of the rotatable antenna system.

More particularly, the wireless rotatable interconnect can include a stator coil pad that is coupled to a power supply port for receiving power and couple to a data port for communication of data. The wireless rotatable interconnect can also include a rotor coil pad that is in bi-directional communication with the stator coil pad. The rotor coil pad superposes the stator coil pad and the rotor coil pad is spaced apart from the stator coil pad. The stator coil pad forms a primary winding of a transformer, and the rotor coil pad forms a secondary winding of the transformer. Energizing the stator coil pad causes mutual inductance between the stator coil pad and the rotor coil pad. The mutual inductance allows the bi-directional communication through magnetic resonance coupling.

Additionally, the rotor coil pad is rotatable about an axis. More particularly, the rotor coil pad can continuously rotate in a clockwise or counterclockwise direction on a plane that intersects the axis at a right angle. A radiating element can be coupled (directly or indirectly) to the rotor coil pad, such that changes in a rotation of the rotor coil pad about the axis change a pointing direction of the radiating element. In some examples, the rotation of the rotor coil pad can change an azimuth of the radiating element. In other examples, rotation of the rotor coil pad can change an elevation or skew of the radiating element.

The wireless rotatable interconnect enables a plurality of wireless channels (e.g., communication channels) to be established between the stator coil pad and the rotor coil pad. Moreover, a power channel of the plurality of channels transfers power from the stator coil pad to the rotor coil pad and a data channel of the plurality of channels transfers data between the stator coil pad and the rotor coil pad. The power supplied to the rotor coil pad can be employed to actuate a motor to rotate the rotatable wireless rotatable interconnect.

As noted, the rotor coil pad and the stator coil pad are spaced part and communicate wirelessly through magnetic resonance coupling. In this manner, the need for a mechanical joint and/or contacts (e.g., brushes) to enable rotation of the radiating element is obviated. Rather, the wireless rotatable interconnect provides a low friction interface between the rotor coil pad and the stator coil pad to allows rotation of the rotor coil pad, which in turn causes rotation of the radiating element without incurring physical wear on a joint and/or the mechanical contacts, thereby extending the serviceable life of the rotatable antenna system. Additionally, by obviating the need for a wired connection between the stator coil pad and the rotor coil pad, the rotor coil pad can be rotated continuously without incurring wire wrap.

FIG. 1 illustrates a block diagram of an example rotatable antenna system 100 that includes a wireless rotatable interconnect 102. The wireless rotatable interconnect 102 can be employed to change a pointing direction of a radiating element 104. The rotatable antenna system 100 can be employed in a mobile satellite antenna that can dynamically change the pointing direction of the radiating element 104. In some examples, the rotatable antenna system 100 can be mounted on an aircraft to communicate with a satellite. In other examples, the rotatable antenna system 100 can be mounted on a watercraft (e.g., a ship) or terrestrial vehicle to communicate with the satellite. In either such situation, movement of the aircraft, watercraft or terrestrial vehicle induces a need to change the pointing direction of the radiating element 104.

In some examples, the radiating element 104 can be representative of a satellite dish (e.g., a feed element and a reflector). In other examples, the radiating element 104 can be representative of a waveguide array.

The wireless rotatable interconnect 102 can include a stator coil pad 110 and a rotor coil pad 112. The rotor coil pad 112 can superpose the stator coil pad 110 The stator coil pad 110 can be configured to remain stationary relative to the rotor coil pad 112 and to the aircraft, watercraft or terrestrial vehicle on which the rotatable antenna system 100 is mounted. The rotor coil pad 112 can rotate about an axis 114 relative to the position of the stator coil pad 110. More particularly, the rotor coil pad 112 can rotate on a plane perpendicular to the axis 114, indicated by arrows 116. That is, the rotor coil pad 112 can rotate clockwise or counter clockwise in the plane that intersects the axis 114 at a right angle.

For purposes of simplification of explanation the term "superpose", is employed throughout this disclosure to denote a relative position of two proximal surfaces in a selected orientation. The examples used throughout this disclosure denote one selected orientation. However, in the described examples, the selected orientation is arbitrary, and other orientations are possible (e.g., upside down, rotated by 90 degrees, etc.) within the scope of the present disclosure.

The stator coil pad 110 can include a primary winding 113 (e.g., a first inductive coil), of a transformer, and the rotor coil pad 112 can include a secondary winding 115 (e.g., a second inductive coil) of the transformer. In this manner, the stator coil pad 110 and the rotor coil pad 112 are spaced apart from each other and if the stator coil pad 110 is energized, the stator coil pad 110 and the rotor coil pad 112 are in mutual inductance with each other. In some examples, the stator coil pad 110 and the rotor coil pad 112 are separated by an air gap. In other examples, the stator coil pad 110 and the rotor coil pad 112 are separated by housings (e.g., a stator housing and a rotor housing) of the respective stator coil pad 110 and the rotor coil pad 112. In such a situation, the stator housing and the rotor housing can be formed of non-conductive material, such as plastic, and the stator housing abuts the rotor housing.

In some examples, the stator coil pad 110 is mounted on an antenna base 120. Similarly, the stator coil pad 110 can be mounted on a rotor base 122. The antenna base 120 can include stator electronic circuits 124 and the rotor base 122 can include rotor electronic circuits 126.

The stator electronic circuits 124 can be coupled to the stator coil pad 110, and can energize the stator coil pad 110. The rotor electronic circuits 126 can be coupled to the rotor coil pad 112. The stator electronic circuits 124 can operate in concert with the rotor electronic circuits 126 to enable wireless bi-directional communication between the stator coil pad 110 and the rotor coil pad 112. In some examples, there can be a plurality of wireless channels between the stator coil pad 110 and the rotor coil pad 112.

More particularly, the stator electronic circuits 124 can also be coupled to a power supply port 130 and a data port 132. The power supply port 130 can be coupled to a power supply 134 that can provide a power signal, such as a direct current (DC) power signal or an alternating current (AC) signal to the stator electronic circuits 124. In such a situation, the stator electronic circuits 124 can include a power control module 136 that can convert and/or condition the power signal into a signal for communication over a power channel of the plurality of wireless channels between the stator coil pad 110 and the rotor coil pad 112. The plurality of wireless channels can be established through magnetic resonance coupling between the stator coil pad 110 and the rotor coil pad 112. Stated differently, a magnetic field established by the mutual inductance between the stator coil pad 110 and the rotor coil pad 112 can allow bi-directional communication between the stator coil pad 110 and the rotor coil pad 112.

Additionally, the data port 132 can be coupled to a network node 140. The network node 140 can be implemented, for example, as a computing platform (e.g., a processor and memory) or a network router that is upstream of a computing platform or multiple computing platforms. The network node 140 can communicate data (e.g., bi-directionally) between the data port 132 and the network node 140. The stator electronic circuits 124 can include a data encoder/decoder module 142 for encoding (e.g., modulating) data provided from the data port 132 onto a data channel of the plurality of wireless channels between the stator coil pad 110 and the rotor coil pad 112. In some examples, the data encoder/decoder module 142 can be implemented with a modem.

Further still, the stator electronic circuits 124 can be coupled to a control port 150. The control port 150 can be coupled to a controller 152. The controller 152 can provide commands for controlling a position of the radiating element 104 to the stator electronic circuits 124. The stator electronic circuits 124 can include a command encoder 154 that can encode (e.g., modulate) commands provided on the control port 150 onto a control channel of the plurality of wireless channels. Moreover, in some examples, commands can be provided on the data port 132 by the network node 140.

The rotor coil pad 112 can receive the signals transmitted through the plurality of wireless channels between the stator coil pad 110 and the rotor coil pad 112. Moreover, the rotor electronic circuits 126 can process signals transmitted through the plurality of wireless channels between the stator coil pad 110 and the rotor coil pad 112.

The rotor electronic circuits 126 can include a data encoder/decoder 168 that can encode (e.g., modulate) data provided on the data channel on to a radio frequency (RF) signal, and provide the modulated RF signal to the radiating element 104 for transmission to the satellite. Additionally, the data encoder/decoder 168 can demodulate a received RF signal, and re-modulate the resultant signal for transmission from the rotor coil pad 112 to the stator coil pad 110 through the data channel of the plurality of channels. The data encoder/decoder 168 can be implemented as a modem.

The rotor electronic circuits 126 can be coupled to a motor 160. The rotor electronic circuits 126 can include a power control module 162 that can provide power provided though the power channel of the plurality of channels to the motor 160 to energize the motor 160. In some examples, the rotor electronic circuits 126 can include an antenna control unit 164 that can decode commands provided on the control channel and/or the data channel of the plurality of channels to control actuation and de-actuation of the motor 160. The power control module 162 can be configured to respond to commands provided from the antenna control unit 164 to the power control. More particularly, the power control module 162 can provide commands to the motor 160 to actuated or de-actuate the motor 160.

The motor 160, upon actuation, drives a rotator 170 that is mechanically coupled to the motor 160 to turn. The rotator 170 can be implemented, for example, as a gear (e.g., a worm gear), a belt and pully, etc. Turning of the rotator 170 causes the rotor coil pad 112 to rotate about the axis 114, namely in a clockwise or counterclockwise direction indicated by the arrows 116. Moreover, certain components, including the radiating element 104 and the rotor base 122 can be coupled to (e.g., mounted on) the rotor coil pad 112. Thus, rotation of the rotor coil pad 112 can cause a corresponding rotation by the radiating element 104 to change a pointing direction of the radiating element 104.

As one example, rotation of the rotor coil pad 112 can change an azimuth of the radiating element 104. In other examples, rotation of the rotor coil pad 112 can change an elevation of the radiating element 104. In still other examples, rotation of the rotor coil pad 112 can change a skew angle of the radiating element 104.

Furthermore, a hold-down 172 can be coupled to the rotor coil pad 112 to limit the rotation of the rotor coil pad 112 to the plane that intersects the axis 114 of rotation at a right angle. Stated differently, the hold-down 172 prevents wobble of the rotor coil pad 112 and limits the rotor coil pad 112 to a single axis of rotation. The hold-down 172 can be implemented, for example, with a bearing or guiderail. In some examples, there can be multiple hold-downs 172.

As noted, the rotor coil pad 112 and the stator coil pad 110 are spaced part and communicate wirelessly through mutual inductance. In this manner, the need for a mechanical joint to enable rotation of the radiating element 104 is obviated. Instead, a low friction interface between the rotor coil pad 112 and the stator coil pad 110 allows for rotation of the rotor coil pad 112, causing rotation of the radiating element 104 without incurring physical wear on a joint or contacts, thereby extending the serviceable life of the rotatable antenna system 100. Further, because there is no wired connection between the stator coil pad 110 and the rotor coil pad 112, the rotor coil pad 112 can be rotated continuously in a clockwise or counter-clockwise direction without incurring wire wrap. Additionally, because power and data are transferred wirelessly between the rotor coil pad 112 and the stator coil pad 110, the need for a mechanical contacts (e.g., brushes) which are prone to failure for coupling to the rotor electronic circuits 126 is avoided.

Figure 2:
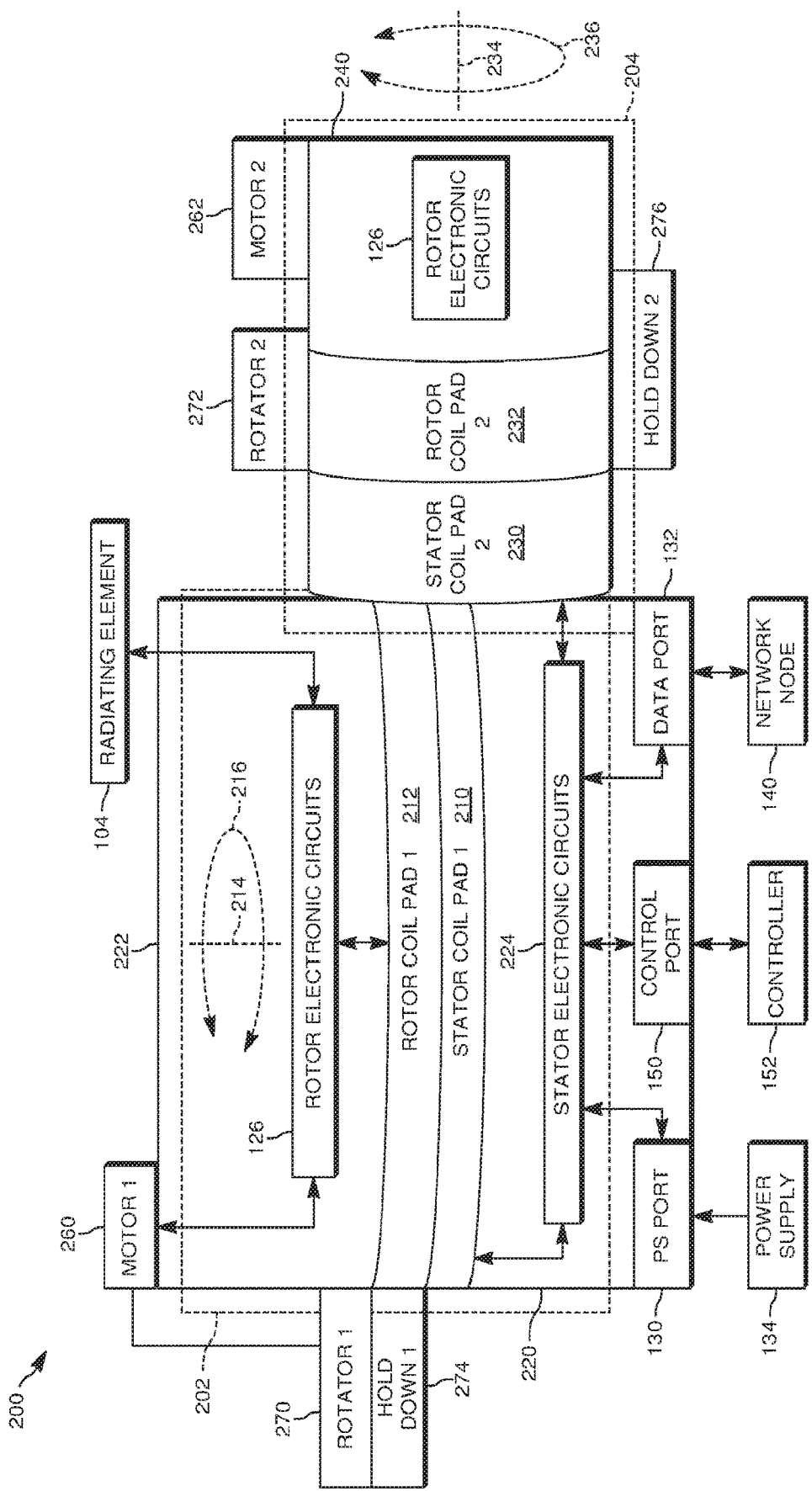
FIG. 2 illustrates a block diagram of a rotatable antenna system with two wireless rotatable interconnects.

FIG. 2 illustrates a block diagram of another example rotatable antenna system 200 that includes two (2) wireless rotatable interconnects, namely a first wireless rotatable interconnect 202 and a second wireless rotatable interconnect 204. The rotatable antenna system 200 can be mounted on an aircraft, watercraft or terrestrial vehicle. The first wireless rotatable interconnect 202 and the second wireless rotatable interconnect 204 can operate in concert to change a pointing direction of a radiating element 104. For purposes of simplification of explanation, the same reference numbers are employed in FIGS. 1 and 2 to denote the same structure. Moreover, some structures are not re-introduced.

The first wireless rotatable interconnect 202 can be implemented with the wireless rotatable interconnect 102 of FIG. 1. The first wireless rotatable interconnect 202 can include a first stator coil pad 210 and a first rotor coil pad 212. The first stator coil pad 210 can be implemented with the stator coil pad 110 of FIG. 1 and the first rotor coil pad 212 can be implemented with the stator coil pad [110] 112 of FIG. 1. Thus, the first stator coil pad 210 can be configured to remain stationary relative to the first rotor coil pad 212 and to the aircraft, watercraft or terrestrial vehicle on which the rotatable antenna system 200 is mounted. The first rotor coil pad 212 can rotate about a first axis 214 relative to the position of the first stator coil pad 210. More particularly, the first rotor coil pad 212 can rotate on a plane perpendicular to the first axis 214, indicated by arrows 216. That is, the first rotor coil pad 212 can rotate clockwise or counter clockwise in the plane that intersects the first axis 214 at a right angle.

In some examples, the first stator coil pad 210 is mounted on an antenna base 220. The first rotor coil pad 212 can be mounted on a first rotor base 222. The antenna base 220 can include the stator electronic circuits 124 of FIG. 1, and the first rotor base 222 can include the rotor electronic circuits 126 of FIG. 1.

The second wireless rotatable interconnect 204 can include a second stator coil pad 230 and a second rotor coil pad 232. The second stator coil pad 230 can be implemented with the stator coil pad 110 of FIG. 1 and the second rotor coil pad 232 can be implemented with the rotor coil pad 112 of FIG. 1. Thus, the second stator coil pad 230 can be configured to remain stationary relative to the second rotor coil pad 232 and to the aircraft, watercraft or terrestrial vehicle on which the rotatable antenna system 200 is mounted. The second rotor coil pad 232 can rotate about a second axis 234 relative to the position of the second stator coil pad 230. More particularly, the second rotor coil pad 232 can rotate on a plane perpendicular to the second axis 234, indicated by arrows 236. That is, the second rotor coil pad 232 can rotate clockwise or counter clockwise in the plane perpendicular to the second axis 234.

In some examples, the second stator coil pad 230 is mounted on the antenna base 220. The second rotor coil pad 232 can be mounted on a second rotor base 240. The second rotor base 240 can include another instance of the rotor electronic circuits 126 of FIG. 1.

In some examples, the stator electronic circuits 124 can be coupled to the first stator coil pad 210 and the second stator coil pad 230. In such a situation, the stator electronic circuits 124 can energize the first stator coil pad 210 and the second stator coil pad 230. The rotor electronic circuits 126 of the first wireless rotatable interconnect 202 can be coupled to the first rotor coil pad 212. The stator electronic circuits 224 can operate in concert with the rotor electronic circuits 126 of the first wireless rotatable interconnect 202 to enable wireless bi-directional communication between the first stator coil pad 210 and the first rotor coil pad 212. In some examples, there can be a plurality of wireless channels between the first stator coil pad 210 and the first rotor coil pad 212. Similarly, the stator electronic circuits 224 can operate in concert with the rotor electronic circuits 126 of the second wireless rotatable interconnect 204 to enable wireless bi-directional communication between the second stator coil pad 230 and the second rotor coil pad 232. In some examples, there can be a plurality of wireless channels between the second stator coil pad 230 and the second rotor coil pad 232. In other examples, multiple instances of the stator electronic circuits 124 can be implemented to communicate with one of the first stator coil pad 210 and the second stator coil pad 230.

The power supply port 130 can be coupled to the power supply 134 that can provide a power signal, such as a DC power signal or an AC signal to the stator electronic circuits 124. In such a situation, the stator electronic circuits 124 can convert and/or condition the power signal into a signal for communication over a power channel of the plurality of wireless channels between the first stator coil pad 210 and the first rotor coil pad 212. Additionally, the stator electronic circuits 124 can convert and/or condition the power signal into a signal for communication over a power channel of the plurality of wireless channels between the second stator coil pad 230 and the second rotor coil pad 232.

Additionally, the data port 132 can be coupled to the network node 140. The network node 140 can communicate data (e.g., bi-directionally) between the data port 132 and the network node 140. The stator electronic circuits 124 can encode (e.g., modulating) data provided from the data port 132 onto a data channel of the plurality of wireless channels between the first stator coil pad 210 and the first rotor coil pad 212.

Further still, the control port 150 can be coupled to the controller 152. The controller 152 can provide commands for rotating the radiating element 104 to the stator electronic circuits 124. The stator electronic circuits 124 can encode (e.g., modulate) commands provided on the control port 150 onto a control channel of the plurality of wireless channels between the first stator coil pad 210 and the first rotor coil pad 212 as well as a control channel of the plurality of wireless channels between the second stator coil pad 230 and the second rotor coil pad 232. Moreover, in some examples, commands can be provided on the data port 132 by the network node 140.

The first rotor coil pad 212 can receive the signals transmitted through the plurality of wireless channels between the first stator coil pad 210 and the first rotor coil pad 212. Similarly, the second rotor coil pad 232 can receive the signals transmitted through the plurality of wireless channels between the second stator coil pad 230 and the second rotor coil pad 232. Moreover, the rotor electronic circuits 126 of the first wireless rotatable interconnect 202 can process signals transmitted through the plurality of wireless channels between the first stator coil pad 210 and the first rotor coil pad 212. Similarly, the rotor electronic circuits 126 of the second wireless rotatable interconnect 204 can process signals transmitted through the plurality of wireless channels between the second stator coil pad 230 and the second rotor coil pad 232.

The rotor electronic circuits 126 of the first wireless rotatable interconnect 202 can encode and decode (e.g., modulate and demodulate) data communicated between the radiating element 104 and a data channel of the plurality of wireless channels. This encoding and decoding enables communication between the satellite and the network node 140.

The rotor electronic circuits 126 of the first wireless rotatable interconnect 202 can be coupled to a first motor 260 and the rotor electronic circuits 126 of the second wireless rotatable interconnect 204 can be coupled to a second motor 262. The rotor electronic circuits 126 of the first wireless rotatable interconnect 202 can provide power provided through the power channel of the plurality of wireless channels to the first motor 260 to energize the first motor 260. Similarly, the rotor electronic circuits 126 of the second wireless rotatable interconnect 204 can provide power provided though the power channel of the plurality of wireless channels to the second motor 262 to energize the second motor 262. The first motor 260 and the second motor 262 can be implemented with the motor 160 of FIG. 1.

In some examples, the rotor electronic circuits 126 of the first wireless rotatable interconnect 202 and the second wireless rotatable interconnect 204 can decode commands provided on the control channel and/or the data channel of the plurality of channels to control actuation and de-actuation of the respective first motor 260 and the second motor 262. Thus, the rotor electronic circuits 126 of the first wireless rotatable interconnect 202 and the second wireless rotatable interconnect 204 can selectively actuate or de-actuate the respective first motor 260 and the second motor 262.

The first motor 260, upon actuation, drives a first rotator 270 that is mechanically coupled to the first motor 260, causing the first rotator 270 to turn. Similarly, the second motor 262, upon activation, drives a second rotator 272 that is mechanically coupled to the second motor 262, causing the second rotator 272 to turn. The first rotator 270 and the second rotator 272 can be implemented with the rotator 170 of FIG. 1. Turning of the first rotator 270 causes the first rotor coil pad 212 to rotate about the first axis 214 and turning of the second rotator 272 causes the second rotor coil pad 232 to turn about the second axis 234. Moreover, certain components, including the radiating element 104 and the first rotor base 222 can be coupled to (e.g., mounted on) the first rotor coil pad 212. Additionally, components, including the radiating element 104 and the second rotor base 240 can be coupled to (e.g., mounted on) the second rotor coil pad 232. Thus, rotation of the first rotor coil pad 212 can cause a corresponding rotation by the radiating element 104 to change a pointing direction of the radiating element 104. Additionally, rotation of the second rotor coil pad 232 can also cause corresponding rotation of the radiating element 104 to change a pointing direction of the radiating element 104.

In some examples, the first axis 214 and the second axis 234 are perpendicular with respect to each other. Thus, in some examples, rotation of the first rotor coil pad 212 can change an azimuth of the radiating element 104 and rotation of the second rotor coil pad 232 can change an elevation of the radiating element 104. In other examples, the first axis 214 and the second axis 234 are arranged at an oblique angle with respect to each other such that rotation of the first rotor coil pad 212 and/or the second rotor coil pad 232 can additionally or alternatively change a skew of the radiating element 104.

Furthermore, a first hold-down 274 can be coupled to the first rotor coil pad 212 to limit the rotation of the first rotor coil pad 212 to the plane that intersects the first axis 214 of rotation (e.g., a single axis of rotation). Additionally, a second hold-down 276 can be coupled to the second rotor coil pad 232 to limit rotation of the second rotor coil pad 232 to the plane that intersects the second axis 234 of rotation (e.g., a single axis of rotation). Stated differently, the first hold-down 274 limits the first rotor coil pad 212 to a first single axis of rotation and the second hold-down 276 limits the second rotor coil pad 232 to a second single axis of rotation. The first hold-down 274 and the second hold downs 276 can be implemented with the hold-down 172 of FIG. 1.

The first rotor coil pad 212 and the first stator coil pad 210 are spaced part and communicate wirelessly through mutual inductance. Additionally, the second rotor coil pad 232 and the second stator coil pad 230 are spaced part and communicate wirelessly through mutual inductance. In this manner, the need for a mechanical joint or mechanical contact to enable rotation of the radiating element 104 is obviated. Instead, a low friction interface between the first rotor coil pad 212 and the first stator coil pad 210 as well as a low friction interface between the second stator coil pad 230 and the second rotor coil pad 232 allows rotation of the respective first rotor coil pad 212 and the second rotor coil pad 232, causing rotation of the radiating element 104 without incurring physical wear on a joint, thereby extending the serviceable life of the rotatable antenna system 200. Additionally, because the interface between the first rotor coil pad 212 and the first stator coil pad 210 and the interface between the second stator coil pad 230 and the second rotor coil pad 232 are each wireless, the first rotor coil pad 212 and the second rotor coil pad 232 can rotate continuously without incurring wire wrap.

Figure 3:
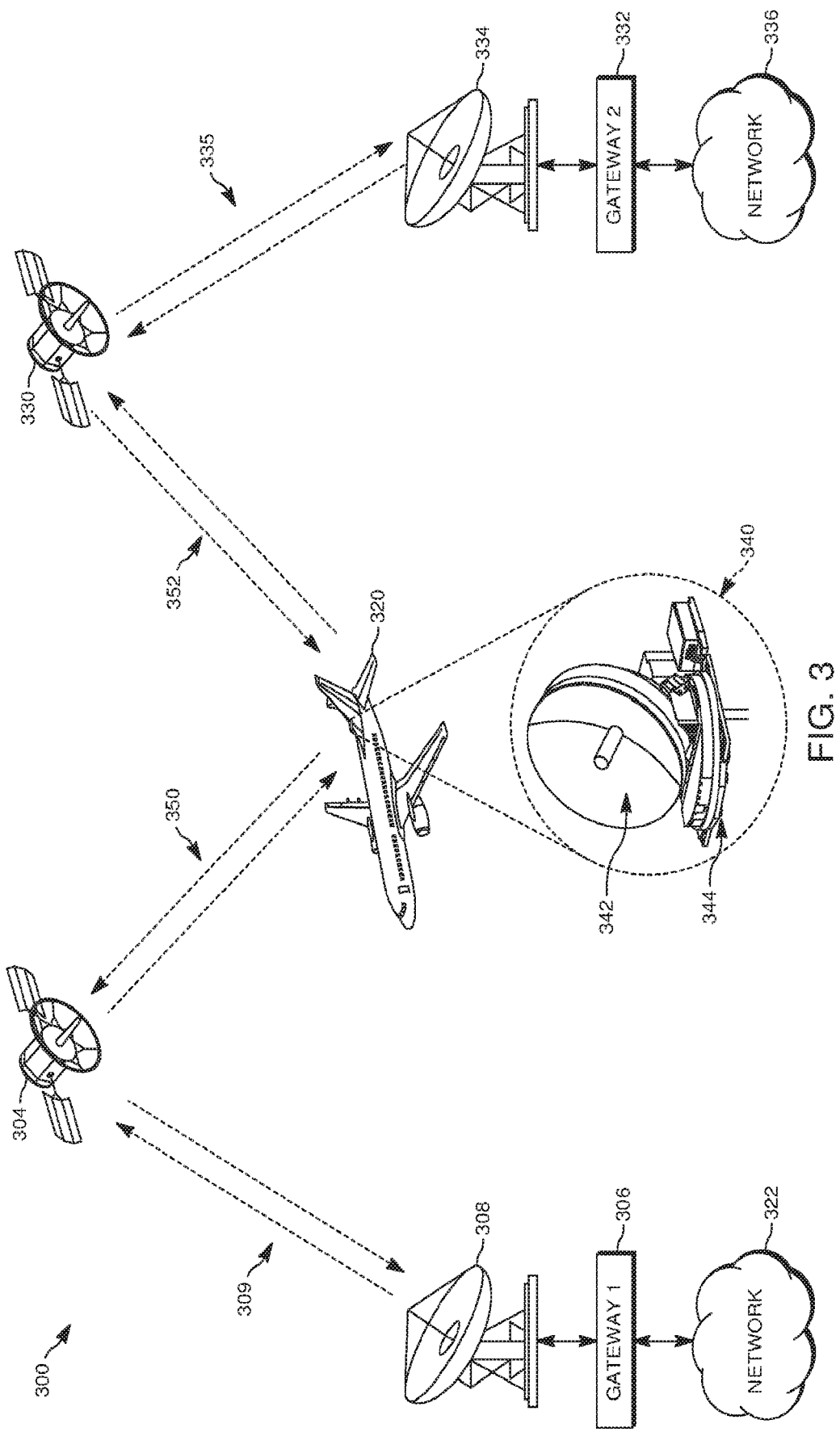
FIG. 3 illustrates a diagram of a satellite communication system with a mobile rotatable antenna system mounted on an aircraft.

FIG. 3 illustrates a diagram of a satellite communication system 300. The satellite communication system 300 includes a first satellite 304, a first gateway 306, a first gateway antenna system 308, and an aircraft 320. The first gateway 306 communicates with at least a first network 322. In operation, the satellite communication system 300 can provide for one-way or two-way communications between the aircraft 320 and the first network 322 through at least the first satellite 304 and the first gateway 306.

In some examples, the satellite communication system 300 includes a second satellite 330, a second gateway 332, and a second gateway antenna system 334. The second gateway 332 can communicate with at least a second network 336. In operation, the satellite communication system 300 can provide for one-way or two-way communications between the aircraft 320 and the second network 336 through at least the second satellite 330 and the second gateway 332.

The first satellite 304 and the second satellite 330 can be any suitable type of communication satellite. In some examples, the first satellite 304 and/or the second satellite 330 can be in a geostationary orbit. In other examples, the first satellite 304 and/or the second satellite 330 can be in appropriate orbit (e.g., low earth orbit (LEO), medium earth orbit (MEO), etc.). The first satellite 304 and/or the second satellite 330 can be a multi-beam satellite configured to provide service for multiple service beam coverage areas in a predefined geographical service area. In some examples, the first satellite 304 and the second satellite 330 can provide service in non-overlapping coverage areas, partially-overlapping coverage areas, or fully-overlapping coverage areas. In some examples, the satellite communication system 300 can include additional satellites.

The first gateway antenna system 308 can be implemented on a satellite ground station and can enable one-way or two-way capable communications between the first satellite 304 and the first gateway antenna system 308. More particularly, the first gateway antenna system 308 can be designed with adequate transmit power and receive sensitivity to communicate reliably with the first satellite 304. The first satellite 304 can communicate with the first gateway antenna system 308 by sending and receiving signals through one or more beams 309. The first gateway 306 sends and receives signals to and from the first satellite 304 using the first gateway antenna system 308. The first gateway 306 is connected to the first network 322. The first network 322 can include a local area network (LAN), metropolitan area network (MAN), wide area network (WAN), and/or any other suitable public or private network and the first network 322 can be connected to other communications networks such as the Internet, telephony networks (e.g., Public Switched Telephone Network (PSTN), etc.

Examples of satellite communication system 300 can include the second satellite 330, along with either unique or shared associated system components. For example, the second gateway antenna system 334 can also be one-way or two-way capable and designed with adequate transmit power and receive sensitivity to communicate reliably with the second satellite 330. The second satellite 330 can communicate with the second gateway antenna system 334 by sending and receiving signals through one or more beams 335. The second gateway 332 sends and receives signals to and from the second satellite 330 using the second gateway antenna system 334. The second gateway 332 is connected to the second network 336. The second network 336 can include a LAN, a MAN, a WAN, and/or any other suitable public or private network and can be connected to other communications networks such as the Internet, telephony networks (e.g., PSTN), etc.

In various examples, the first network 322 and the second network 336 can be the same or different networks. Additionally, the first gateway 306 and the second gateway 332 can be different gateways, or the same gateway. In various examples, the first gateway antenna system 308 and the second gateway antenna system 334 can be different gateway antenna systems, or the same gateway antenna system.

The aircraft 320 can employ a communication system including a mobile rotatable antenna system 340 mounted on the aircraft 320. The mobile rotatable antenna system 340 can be implemented, for example with the rotatable antenna system 100 of FIG. 1 or the rotatable antenna system 200 of FIG. 2. The mobile rotatable antenna system 340 can include a radiating element 342 for communicating with the first satellite 304 and the second satellite 330. The mobile rotatable antenna system 340 can be mounted on the outside of the fuselage of the aircraft 320. The mobile rotatable antenna system 340 can include at least one wireless rotatable interconnect 344 to allow a change in a pointing direction of the radiating element 342 during operation. In some examples, multiple wireless rotatable interconnects 344 can be included to allow a change in an azimuth, an elevation and/or a skew of the radiating element 342.

The radiating element 342 can operate in the International Telecommunications Union (ITU) Ku, K, or Ka-bands, for example from approximately 17 to 31 Giga-Hertz (GHz). Alternatively, the radiating element 342 can operate in other frequency bands such as C-band, X-band, S-band, L-band, and the like. In various examples, the radiating element 342 can be configured to operate on multiple frequency bands, or on a single frequency band.

In operation, the aircraft 320 can have a location that is within a coverage area of the first satellite 304 and/or within a coverage area of the second satellite 330, and the mobile rotatable antenna system 340 can be controlled to cause the radiating element 342 to selectively point toward the first satellite 304 or the second satellite 330. Additionally, as explained herein, employment of the at least one wireless rotatable interconnect 344 enables the pointing direction of the radiating element 342 to be changed without incurring mechanical wear on a joint or mechanical contacts. Stated differently, the at least one wireless rotatable interconnect 344 enables rotation of the radiating element 342 without a mechanical joint or contacts (e.g., a rotary joint) that is prone to failure after repeated use.

For instance, in a first mode of operation, while the aircraft 320 is located within a coverage area of the first satellite 304, the aircraft 320 can use the radiating element 342 of the mobile rotatable antenna system 340 to communicate with the first satellite 304 over one or more first beams 350. In a second mode of operation, while the aircraft 320 is located within a coverage area of the second satellite 330, the aircraft 320 can use the radiating element 342 of the mobile rotatable antenna system 340 to communicate with the second satellite 330 over one or more second beams 352. The second mode can be selected, for instance, in response to the aircraft 320 entering a coverage area of the second satellite 330, and/or leaving a coverage area of the first satellite 304, such that the pointing direction of the radiating element 342 is changed to point toward the second satellite 330. In examples where the aircraft is located within an overlapping coverage area of both the first satellite 304 and the second satellite 330, the second mode can be selected based on other factors, such as network availability, communication capacity, communication costs, signal strength, signal quality, etc.

The communication system of the aircraft 320 can provide communication services for communication devices within the aircraft 320 via an encoder/decoder, such as the data encoder/decoder module 142 of FIG. 1. The communication devices can be, for example, portable communication devices, such as laptops, tablet computers, smart phones, etc. Communication devices can utilize the mobile rotatable antenna system 340 to connect to and access the first network 322 and/or the second network 336. For example, the communication devices can communicate with the first network 322 and/or the second network 336 via network connections to a router, which can be wired or wireless. A wireless connection can be, for example, of a wireless local area network (WLAN) technology such as IEEE 802.21 (Wi-Fi), or other wireless communication technology.

Figure 4A:
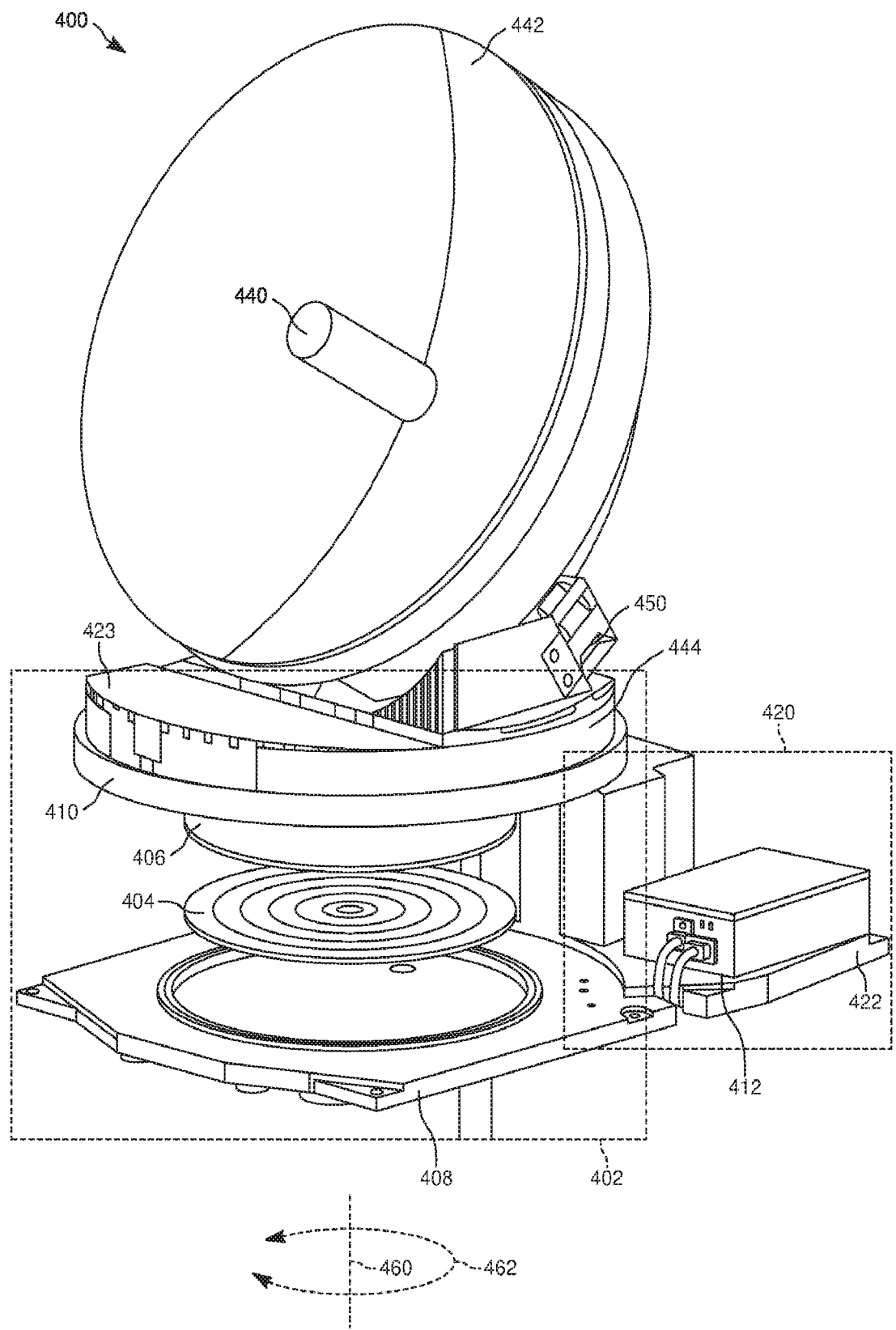
FIG. 4A illustrates an exploded view of a rotatable antenna system with a wireless rotatable interconnect.
Figure 4B:
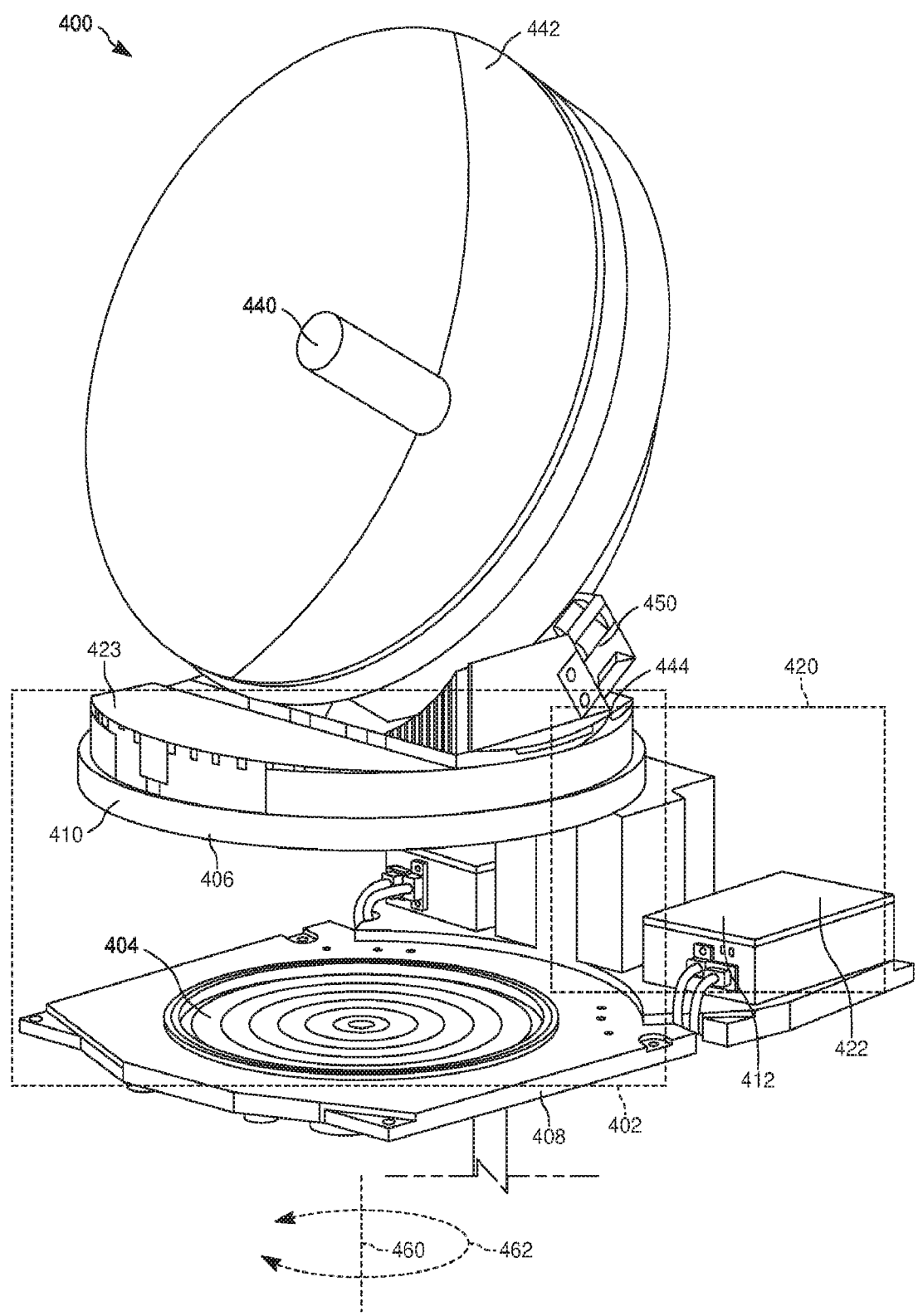
FIG. 4B illustrates a partially assembled exploded view of the rotatable antenna system of FIG. 4A.
Figure 4C:
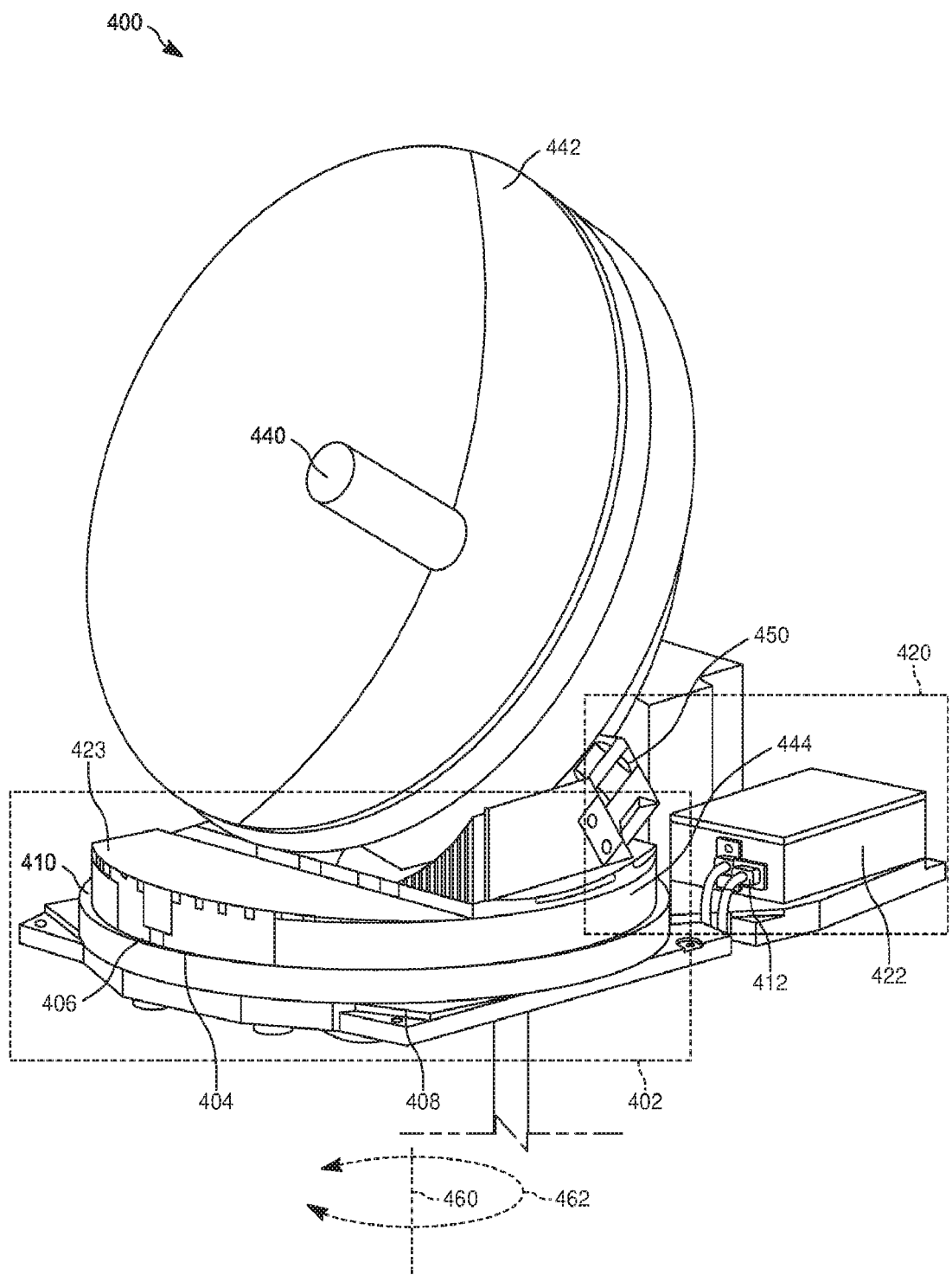
FIG. 4C illustrates an assembled view of the rotatable antenna system of FIG. 4A.

FIG. 4A illustrates an exploded view of an rotatable antenna system 400 that includes a wireless rotatable interconnect 402. FIG. 4B illustrates a partially assembled exploded view of the rotatable antenna system 400. FIG. 4C illustrates the rotatable antenna system 400 in assembled form. The wireless rotatable interconnect 402 can include a stator coil pad 404 and a rotor coil pad 406. The wireless rotatable interconnect 402 can be implemented with the wireless rotatable interconnect 402 of FIG. 1.

The rotor coil pad 406 can superpose the stator coil pad 404, and the rotor coil pad 406 can be spaced apart from the stator coil pad 404. The rotor coil pad 406 can be implemented with the rotor coil pad 112 of FIG. 1 and the stator coil pad 404 can be implemented with the stator coil pad 110 of FIG. 1. The stator coil pad 404 can be mounted on an antenna base 408 and the rotor coil pad 406 can be mounted on a rotor base 410. The antenna base 408 can be implemented in a manner similar to the antenna base 120 of FIG. 1. Additionally, the rotor base 410 can be implemented with the rotor base 122 of FIG. 1.

The antenna base 408 can include a power supply port (hidden from view) that is coupled to a power supply (not shown). The antenna base 408 can also include a data port 412 that receives data from a network node. The antenna base 408 can include stator electronic circuits 420 that can be implemented with the stator electronic circuits 124 of FIG. 1. Additionally, the rotor base 410 can include rotor electronic circuits 423 that can be implemented with the rotor electronic circuits 126 of FIG. 1.

The stator electronic circuits 420 and the rotor electronic circuits 423 can establish bi-directional communication between the stator coil pad 404 and the rotor coil pad 406 over a plurality of wireless channels, such as a power channel, a data channel and a command channel. In particular, the stator electronic circuits 420 can include a data encoder/decoder 422 that can encode (e.g., modulate) and/or decode (e.g., demodulate) data communicated with the network node for communication across the data channel between the stator coil pad 404 and the rotor coil pad 406. Additionally, in some examples, commands for controlling a position of the rotor coil pad 406 can be provided through the data port 412. In such a situation, the commands can be provided through the command channel of the plurality of wireless channels. In other examples, the commands can be provided through a control port (not shown) such as the control port 150 of FIG. 1.

The antenna base 408 can include a power supply port (hidden from view). The stator electronic circuits 420 can include a power control module (e.g., the power control module 136 of FIG. 1) for supplying a power signal through the power channel of the plurality of wireless channels between the stator coil pad 404 and the rotor coil pad 406.

A radiating element 440 can be mounted on the rotor base 410. The radiating element 440 can be implemented with the radiating element 104 of FIG. 1. In the example illustrated, the radiating element 440 is implemented as feedhorn mounted on a focal point of a concave shaped reflector 442. In the present example, the pointing direction of the reflector 442 defines the pointing direction of the radiating element 440 because RF signals are communicated with the radiating element 440 in the pointing direction of the reflector 442.

The rotor base 410 can include rotor electronic circuits 444 (e.g., the rotor electronic circuits 126 of FIG. 1) that can be coupled to the radiating element and the rotor coil pad 406. Thus, the rotor electronic circuits 444 can be employed to facilitate communication between the stator electronic circuits 420 and the radiating element 440.

Additionally, a motor 450 can be coupled to the rotor electronic circuits 423. The rotor electronic circuits 423 can selectively provide the power signal received through the power channel to the motor 450. The motor 450, upon actuation, can drive a rotator (hidden from view), causing the rotor coil pad 406 to rotate about an axis 460. A mechanical hold down (hidden from view) can limit the rotation of the rotor coil pad 406 to a plane that intersects the axis 460 at a right angle.

The rotor coil pad 406 can rotate about an axis 460 in a continuous clockwise or counter clockwise direction, as indicated by an arrows 462. Rotation of the rotor coil pad 406 can cause the radiating element 440 to change pointing directions. In the example illustrated, rotation of the rotor coil pad 406 causes a change in an azimuth of the radiating element 440. However, in other examples, rotation of the rotor coil pad 406 can cause the radiating element 440 to change an elevation and/or a skew.

The wireless rotatable interconnect 402 enables rotation of the radiating element 440 without inducing a wear on a mechanical joint and/or mechanical contacts (e.g., brushes). Moreover, because the stator coil pad 404 and the rotor coil pad 406 communicate wirelessly, the rotor coil pad 406 can be rotated continuously without a cable wrap.

Figure 5A:
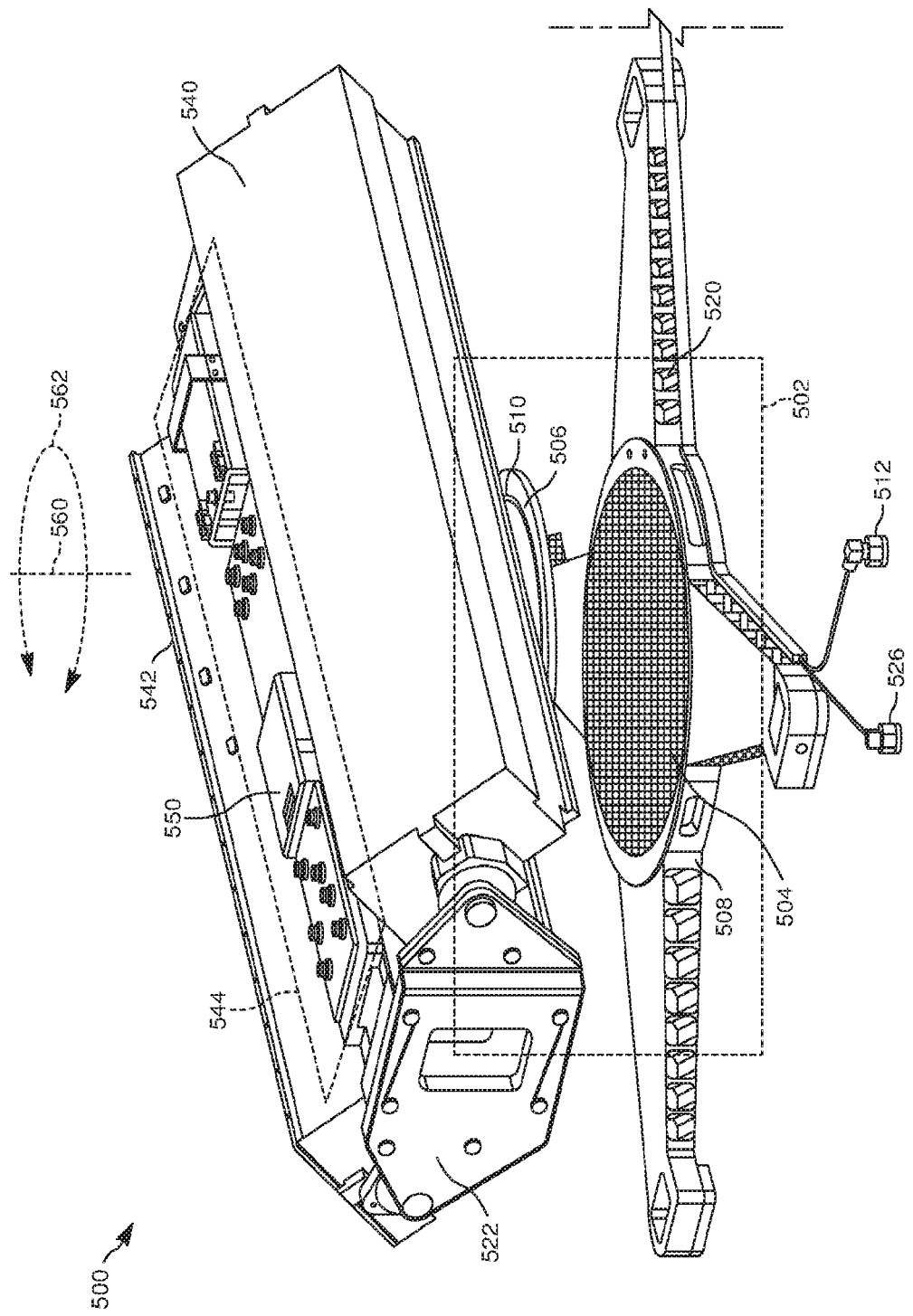
FIG. 5A illustrates an exploded view of another rotatable antenna system with a wireless rotatable interconnect.
Figure 5B:
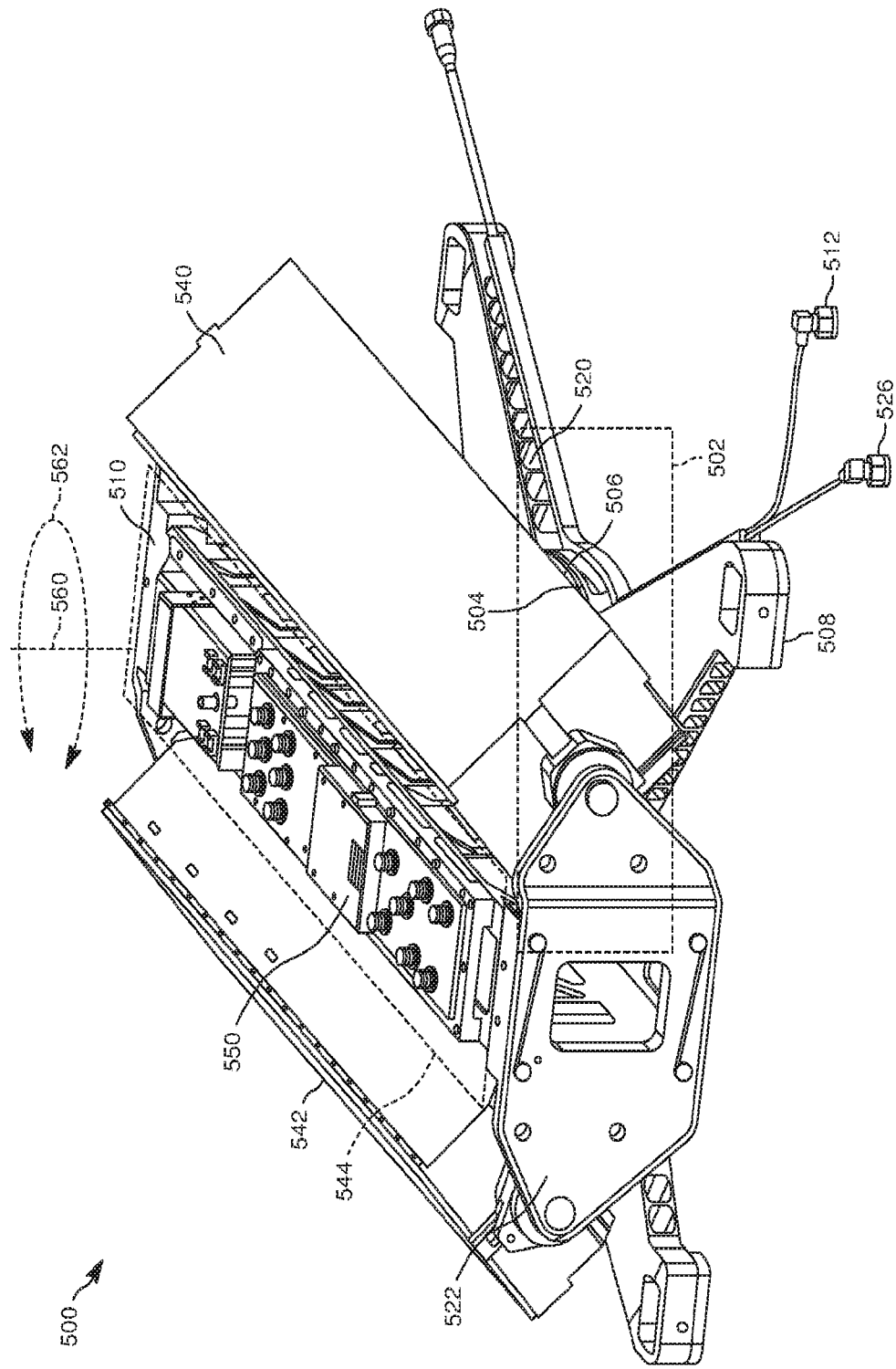
FIG. 5B illustrates an assembled view of the rotatable antenna system of FIG. 5A.

FIG. 5A illustrates an exploded view of an rotatable antenna system 500 that includes a wireless rotatable interconnect 502. FIG. 5B illustrates the rotatable antenna system 500 in assembled form. The wireless rotatable interconnect 502 can include a stator coil pad 504 and a rotor coil pad 506. The wireless rotatable interconnect 502 can be implemented with the wireless rotatable interconnect 502 of FIG. 1.

The rotor coil pad 506 can superpose the stator coil pad 504, and the rotor coil pad 506 can be spaced apart from the stator coil pad 504. The rotor coil pad 506 can be implemented with the rotor coil pad 112 of FIG. 1 and the stator coil pad 504 can be implemented with the stator coil pad 110 of FIG. 1. The stator coil pad 504 can be mounted on an antenna base 508 and the rotor coil pad 506 can be mounted on a rotor base 510. The antenna base 508 can be implemented with the antenna base 120 of FIG. 1. Additionally, the rotor base 510 can be implemented with the rotor base 122 of FIG. 1.

The antenna base 508 can include a power supply port (hidden from view) that is coupled to a power supply (not shown). The antenna base 508 can also include a data port 512 that receives data from a network node. The antenna base 508 can include stator electronic circuits 520 that can be implemented with the stator electronic circuits 124 of FIG. 1. Additionally, the rotor base 510 can include rotor electronic circuits 522 that can be implemented with the rotor electronic circuits 126 of FIG. 1.

The stator electronic circuits 520 and the rotor electronic circuits 522 can establish bi-directional communication between the stator coil pad 504 and the rotor coil pad 506 over a plurality of wireless channels, such as a power channel, a data channel and a command channel. In particular, the stator electronic circuits 520 can include a data encoder/decoder that can encode (e.g., modulate) and/or decode (e.g., demodulate) data communicated with the network node for communication across the data channel between the stator coil pad 504 and the rotor coil pad 506. Additionally, in some examples, commands for controlling a position of the rotor coil pad 506 can be provided through the data port 512. In such a situation, the commands can be provided through the command channel of the plurality of wireless channels. In other examples, the commands can be provided through a control port (not shown) such as the control port 150 of FIG. 1.

The antenna base 508 can include a power supply port 526 (hidden from view). The stator electronic circuits 520 can include a power control module (e.g., the power control module 136 of FIG. 1) for supplying a power signal through a power channel of the plurality of wireless channels between the stator coil pad 504 and the rotor coil pad 506.

A first radiating element 540 and a second radiating element 542 can be mounted on the rotor base 510. The first radiating element 540 and the second radiating element 542 can be implemented with the radiating element 104 of FIG. 1. In the example illustrated, each of the first radiating element 540 and the second radiating element 542 is implemented as a waveguide array. In the present example, the first radiating element 540 and the second radiating element 542 point in different directions. In such a situation, the first radiating element 540 and the second radiating element 542 can be oriented to communicate with different satellites, such as the first satellite 304 and the second satellite 330 of FIG. 3. Additionally, in the example illustrated, the first radiating element 540 and the second radiating element 542 have an azimuth that is 180 degrees apart.

The rotor base 510 can include rotor electronic circuits 544 (e.g., the rotor electronic circuits 126) that can be coupled to the radiating element and the rotor coil pad 506. Thus, the rotor electronic circuits 544 can be employed to facilitate communication between the stator electronic circuits 520 and the first radiating element 540.

Additionally, a motor 550 can be coupled to the rotor electronic circuits 522. The rotor electronic circuits 522 can selectively provide the power signal received through the power channel to the motor 550. The motor 550, upon actuation, can drive a rotator (hidden from view), causing the rotor coil pad 506 to rotate about an axis 560. A mechanical hold down (hidden from view) can limit the rotation of the rotor coil pad 506 to a plane that intersects the axis 560 at a right angle.

The rotor coil pad 506 can rotate about an axis 560 continuously in a clockwise or counter clockwise direction, as indicated by arrows 562. Rotation of the rotor coil pad 506 can cause the first radiating element 540 and the second radiating element 542 to change pointing directions. In the example illustrated, rotation of the rotor coil pad 506 causes a change in an azimuth of the first radiating element 540 and the second radiating element 542. However, in other examples, rotation of the rotor coil pad 406 can cause the first radiating element 540 and the second radiating element 542 to change an elevation and/or a skew.

The wireless rotatable interconnect 502 enables rotation of the first radiating element 540 and the second radiating element 542 without inducing a wear on a mechanical joint and/or mechanical contacts (e.g., brushes). Moreover, because the stator coil pad 504 and the rotor coil pad 506 communicate wirelessly, the rotor coil pad 506 can be rotated continuously without a cable wrap.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A rotatable antenna comprising:
   a wireless rotatable interconnect comprising:
      a stator coil pad coupled to a power supply port for receiving power and to a data port for communication of data, wherein the stator coil pad comprises a planar stator coil surface; and
      a rotor coil pad that is in bi-directional communication with the stator coil pad, wherein the rotor coil pad comprises a planar rotor coil surface;
   wherein the rotor coil pad superposes the stator coil pad and the planar rotor coil surface is spaced apart from the planar stator coil surface, wherein the planar rotor coil surface is parallel with the planar stator coil surface; and wherein the rotor coil pad is rotatable about an axis in a clockwise or counterclockwise direction on a plane perpendicular to the axis, wherein the axis is fixed relative to the wireless rotatable interconnect;
   a radiating element coupled to the rotor coil pad, wherein changes in a rotation of the rotor coil pad about the axis change a pointing direction of the radiating element;
   wherein a plurality of wireless channels are established between the stator coil pad and the rotor coil pad and a first channel of the plurality of wireless channels transfers power from the stator coil pad to the rotor coil pad and a second channel of the plurality of wireless channels transfers data between the stator coil pad and the rotor coil pad;

a data encoder coupled to the rotor coil pad that modulates at least a portion of the data transmitted through the second channel of the plurality of wireless channels onto a radio frequency (RF) signal, and provides the RF signal to the radiating element; and a mechanical hold down to limit the rotation of the rotor coil pad to a plane that intersects the axis at a right angle and wherein the plane is parallel with both the planar rotor coil surface and the planar stator coil surface.

2. The rotatable antenna of claim 1, wherein a third channel of the plurality of wireless channels transfers commands for controlling a position of the rotor coil pad.

3. The rotatable antenna of claim 2, further comprising:

an antenna control unit coupled to the rotor coil pad, wherein the antenna control unit receives the commands on the third channel of the plurality of wireless channels; and a motor coupled to a rotator for rotating the rotor coil pad, wherein the antenna control unit provides commands for controlling the motor in response to receipt of the commands on the third channel of the plurality of wireless channels.

4. The rotatable antenna of claim 3, wherein the motor receives a power signal from the rotor coil pad that is provided in response to power transferred to the rotor coil pad via the first channel.

5. The rotatable antenna of claim 1, wherein rotation of the rotor coil pad changes an azimuth of the radiating element.

6. The rotatable antenna of claim 1, wherein the wireless rotatable interconnect is a first wireless rotatable interconnect, and the axis is a first axis, the rotatable antenna further comprising:

a second wireless rotatable interconnect comprising:

a stator coil pad coupled to the power supply port for receiving power;

a rotor coil pad that is in bi-directional communication with the stator coil pad of the second wireless rotatable interconnect, wherein the rotor coil pad of the second wireless rotatable interconnect superposes the stator coil pad of the second wireless rotatable interconnect and the rotor coil pad of the second wireless rotatable interconnect is spaced apart from the stator coil pad of the second wireless rotatable interconnect, and the rotor coil pad of the second wireless rotatable interconnect is rotatable about a second axis; and wherein the radiating element is coupled to the rotor coil pad of the second wireless rotatable interconnect, wherein changes in a rotation of the rotor coil pad of the second wireless rotatable interconnect about the second axis change a pointing direction of the radiating element.

7. The rotatable antenna of claim 6, wherein rotation of the rotor coil pad of the first wireless rotatable interconnect changes an azimuth of the radiating element and rotation of the rotor coil pad of the second wireless rotatable interconnect changes an elevation of the radiating element.

8. The rotatable antenna of claim 1, wherein the primary winding establishes mutual inductance with the secondary winding.

9. The rotatable antenna of claim 1, wherein the primary winding establishes magnetic resonance coupling with the secondary winding.

10. The rotatable antenna of claim 1, further comprising:

a first housing formed of non-conductive material that houses the stator coil pad; and a second housing formed of non-conductive material that houses the rotor coil pad, wherein the second housing abuts the first housing at a planar interface.

11. The rotatable antenna of claim 1, wherein the radiating element is mounted in a satellite dish.

12. The rotatable antenna of claim 1, wherein the radiating element is a wave guide array.

13. The rotatable antenna of claim 1, wherein the radiating element is a first radiating element pointing in a first direction, the rotatable antenna comprising a second radiating element pointing in a second direction, wherein the second direction opposes the first direction.

\* \* \* \* \*